(12) United States Patent
Kekki et al.

(10) Patent No.: US 7,257,778 B2
(45) Date of Patent: Aug. 14, 2007

(54) CALENDAR SYSTEM AND A METHOD FOR PRODUCING A CALENDAR VIEW

(75) Inventors: Jussi-Pekka Kekki, Tampere (FI); Nina Mäki, Tampere (FI); Juha Pusa, Pirkkala (FI); Minna Karukka, Oulu (FI)

(73) Assignee: Nokia Corporation, Espoo (FI)

( * ) Notice: Subject to any disclaimer, the term of this patent is extended or adjusted under 35 U.S.C. 154(b) by 741 days.

(21) Appl. No.: 10/449,919

(22) Filed: May 30, 2003

(65) Prior Publication Data
US 2004/0032427 A1    Feb. 19, 2004

(30) Foreign Application Priority Data
May 31, 2002    (FI)    ................................ 20021037

(51) Int. Cl.
G06F 3/048    (2006.01)
G06F 19/00    (2006.01)
G06T 15/00    (2006.01)

(52) U.S. Cl. ...................... 715/848; 715/849; 715/963; 715/864; 345/440.2; 345/427; 345/419; 705/9

(58) Field of Classification Search ................ 715/848, 715/849, 850, 963, 864, 836, 976; 345/419, 345/421, 427, 440.2, 440; 705/9, 8, 7
See application file for complete search history.

(56) References Cited

U.S. PATENT DOCUMENTS 5,555,354 A * 9/1996 Strasnick et al. ........... 345/427
5,745,110 A * 4/1998 Ertemalp ............. 345/440.2 X
5,936,625 A * 8/1999 Kahl et al. ............... 715/963 X
5,943,679 A    8/1999 Niles et al. .................. 707/526
5,966,509 A    10/1999 Abe et al. .............. 395/182.02

(Continued)

FOREIGN PATENT DOCUMENTS

CN    1252573    5/2000

(Continued)

OTHER PUBLICATIONS

"Developing Calendar Visualizers for the Information Visualizer" by J. Mackinlay et al, Proceedings of the ACM Symposium on User Interface Software and Technology, Nov. 2-4, 1994, pp. 109-118.

(Continued)

*Primary Examiner*—Raymond J. Bayerl

(57) ABSTRACT

A device and also a system for generating a period-specific calendar view in an electronic device with a display for displaying information and a database for storing calendar data, wherein the method reads calendar data of the period from the database for a calendar view, wherein the period comprises a set of shorter periods which cover the period in a compiled manner, to be displayed in the calendar view, and wherein the calendar data comprise a set of user activities which are allocated to the shorter periods, and the calendar view is displayed on the display of the device by using the calendar data, wherein a quantitative distribution of the activities within the scope of the period is visualized in a three-dimensional bar chart, whose single bar structure illustrates a shorter period of time and its length dimension is dependent on the quantity of activities within the shorter period.

43 Claims, 2 Drawing Sheets

U.S. PATENT DOCUMENTS

| | | |
|---|---|---|
| 5,970,466 A | 10/1999 | Detjen et al. ............... 705/8 |
| 6,101,480 A | 8/2000 | Conmy et al. ............... 705/9 |
| 6,236,396 B1 * | 5/2001 | Jenson et al. ........... 715/963 X |
| 6,253,218 B1 | 6/2001 | Aoki et al. ............... 707/526 |
| 6,281,898 B1 | 8/2001 | Nikolovska et al. ........ 345/355 |
| 6,466,236 B1 * | 10/2002 | Pivowar et al. ......... 715/963 X |
| 2001/0052110 A1 | 12/2001 | Orbanes et al. |
| 2002/0089550 A1 | 7/2002 | Orbanes et al. |
| 2002/0116459 A1 * | 8/2002 | Zuberec et al. ......... 345/751 X |

FOREIGN PATENT DOCUMENTS

| | | |
|---|---|---|
| EP | 0429391 A1 | 5/1991 |
| EP | 0540442 | 5/1993 |
| EP | 0542660 | 5/1993 |
| EP | 0342140 | 1/1996 |
| EP | 0924595 | 6/1999 |
| EP | 0946028 | 9/1999 |
| WO | WO 01/27735 | 4/2001 |
| WO | 0186481 | 11/2001 |

OTHER PUBLICATIONS

"Social, Individual & Technological Issues for Groupware Calendar Systems", Leysia Palen, Conference on Human Factors in Computing Systems, 1999, pp. 17-24, retrieved from the internet.

"Design Essentials—Professionelle Techniken mit Photoshop und Illustrator", Luanne Seymour-Cohan, Markt & Technik Verlag, 2000, pp. 22-34, pp. 107-111.

* cited by examiner

CALENDAR SYSTEM AND A METHOD FOR PRODUCING A CALENDAR VIEW

CROSS-REFERENCE TO RELATED APPLICATIONS

This application claims priority under 35 USC §119 to Finnish Patent Application No. 20021037 filed on May 31, 2002.

FIELD OF THE INVENTION

The invention relates to a method for producing a period-specific calendar view in an electronic device. The invention also relates to an electronic device.

Mobile phones arranged to operate in mobile phone systems based on a cellular network are normally also provided with calendar applications relating to the user's time management, the maintenance of data relating to tasks, or the maintenance of client management. Typically, the calendar applications are used to enter information about appointments, schedules and contact data, as well as tasks to be performed. Information is collected in various ways in a database consisting of a memory or a file. On the basis of the data, the information is normally presented in the form of a table or a chart where the user can view day-specific information, normally with the precision of an hour.

One mobile phone with its apparatus is presented in application publication EP 0 946 028 A2, which also discloses the function of menus on a display. One calendar system is presented in application publication EP 0 924 595 A2 which is intended for portable electronic products, such as personal digital assistants and palmtop computers. Said calendar view covers the period of one month, with days as shorter periods. By means of various functions, day-specific data can also be displayed with the precision one hour. One calendar system intended for PC devices is disclosed in application publication EP 0 342 140 B1.

BACKGROUND OF THE INVENTION

The clarity of the prior art calendars is insufficient, and it is difficult for the user to quickly establish an idea of the tasks required in a longer period and marked in the calendar. To obtain a general view, shifts are often required between various displays, including either month- or day-specific displays and calendar views, which makes the operation slower and further confuses the general impression. Furthermore, portable electronic devices often have the problem of limited size and resolution of the display, wherein the quantity of text-format data fitting on the display is limited, and shifting between various calendar views is increased. Systems of the prior art have the advantage of the capacity to store large quantities of data but at the cost of clarity, and they do not provide any means for the monitoring and evaluation of, for example, the month-specific workload on an overall level, because the systems are even too detailed in that respect.

SUMMARY OF THE INVENTION

It is an aim of the present invention to eliminate the above-mentioned problems and to present a system and a method resulting in a calendar view which, at one glimpse, visualizes the tasks of the user for a desired period, for example the workload for a period of a month.

A central principle of the invention is the calendar view which will easily provide the user with an overview of the situation. By means of other functions in the calendar system, it is then possible to place the planned activities in a suitable period of time. The purpose of the overview provided by the system is not to present detailed data but primarily to outline the whole and, in particular, to make it possible to draw free conclusions on the load rate of the period or variations therein. This will tell volumes to the user, particularly when each month or, for example, each week is changed in the calendar view at a time, providing a picture of the activities of a year or a month.

Another central principle is the use of a 3-dimensional bar graph, whose dimensions depend on the activities of the period as defined by the user in the system. The functionality of the calendar system is also increased by managing the 3-dimensional view by changing, for example, the angle of viewing. By changing the layout of the bar chart, the user can select the direction and angle of viewing to please him/her and to display the period to be viewed in the best way. A particularly useful feature is the possibility to remove or put down desired bars in the bar chart, wherein the bars behind them and the information included in them can be better displayed. The method can be applied in such a way that the days of a month are, according to the weeks, underneath each other, and the weeks presented in the front are either put down or erased, wherein the weeks behind them can be seen more clearly.

An advantage of the calendar system is the suitability for small displays with a limited resolution. By means of the perspective view, the situation of a given period is displayed to the user by limiting the information to the essential. The system is also suitable for large computer displays with a high resolution, because the side surfaces of the bars in the chart can now be provided, for example, with an hour-specific schedule and a list of tasks to be read by the user. The system is also provided with day-specific calendar views in which the data is entered and in which only one day is viewed in more detail at a time.

The invention is suitable for use in a variety of electronic devices, particularly palmtop computers, PDA devices and mobile phones, in which the calendar system is either built-in or it can be downloaded as separate software. The invention is also suitable for use in various PC devices and known general-purpose computers, whose operation is controlled by an operating system. In this case, the calendar system is a software product to be sold separately, to be installed in the computer and to control the computer and its operation under the operating system and using its services. Thus, application is made of the memory means of the computer for storing the calendar data as a database, or of the display where the desired calendar view is generated. In other respects, the above-mentioned devices operate in a way known as such, and they apply known devices or software components arranged to provide, for example, a desired calendar view or the processing of calendar data according to instructions and commands from the calendar system software.

DESCRIPTION OF THE DRAWINGS

In the following, the invention will be described in more detail by using as examples some advantageous embodiments with reference to the appended drawings, in which.

DETAILED DESCRIPTION OF THE INVENTION

Figure 1:
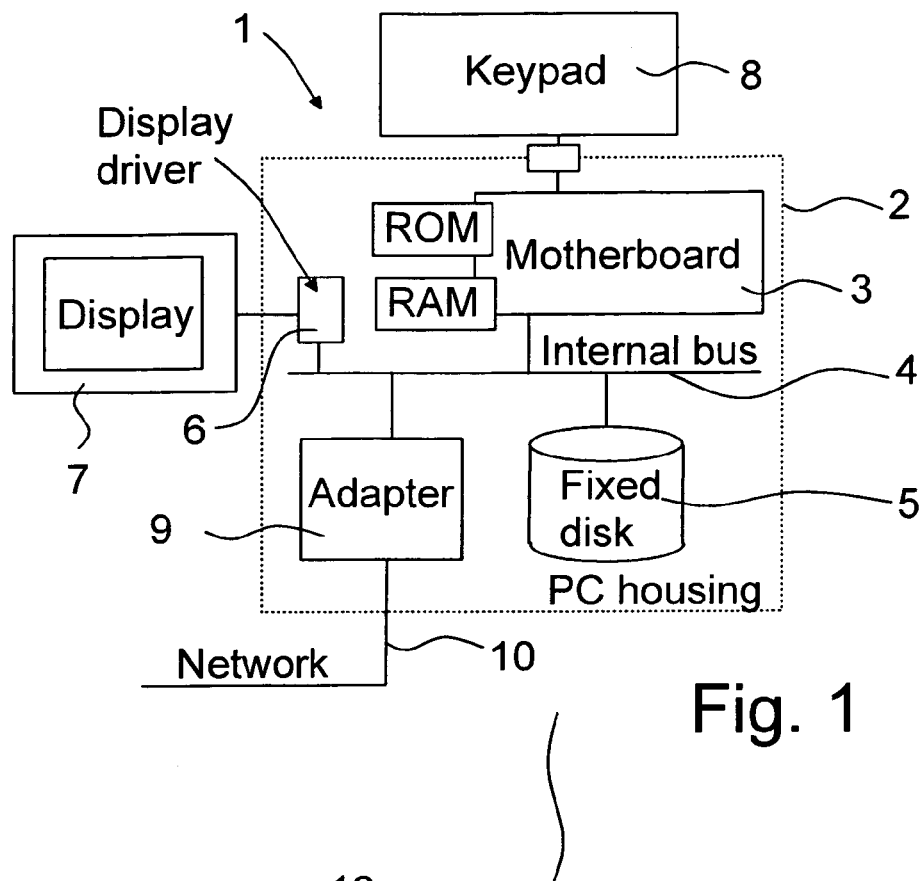
FIG. 1 shows the principle of a computer device.
Figure 3:
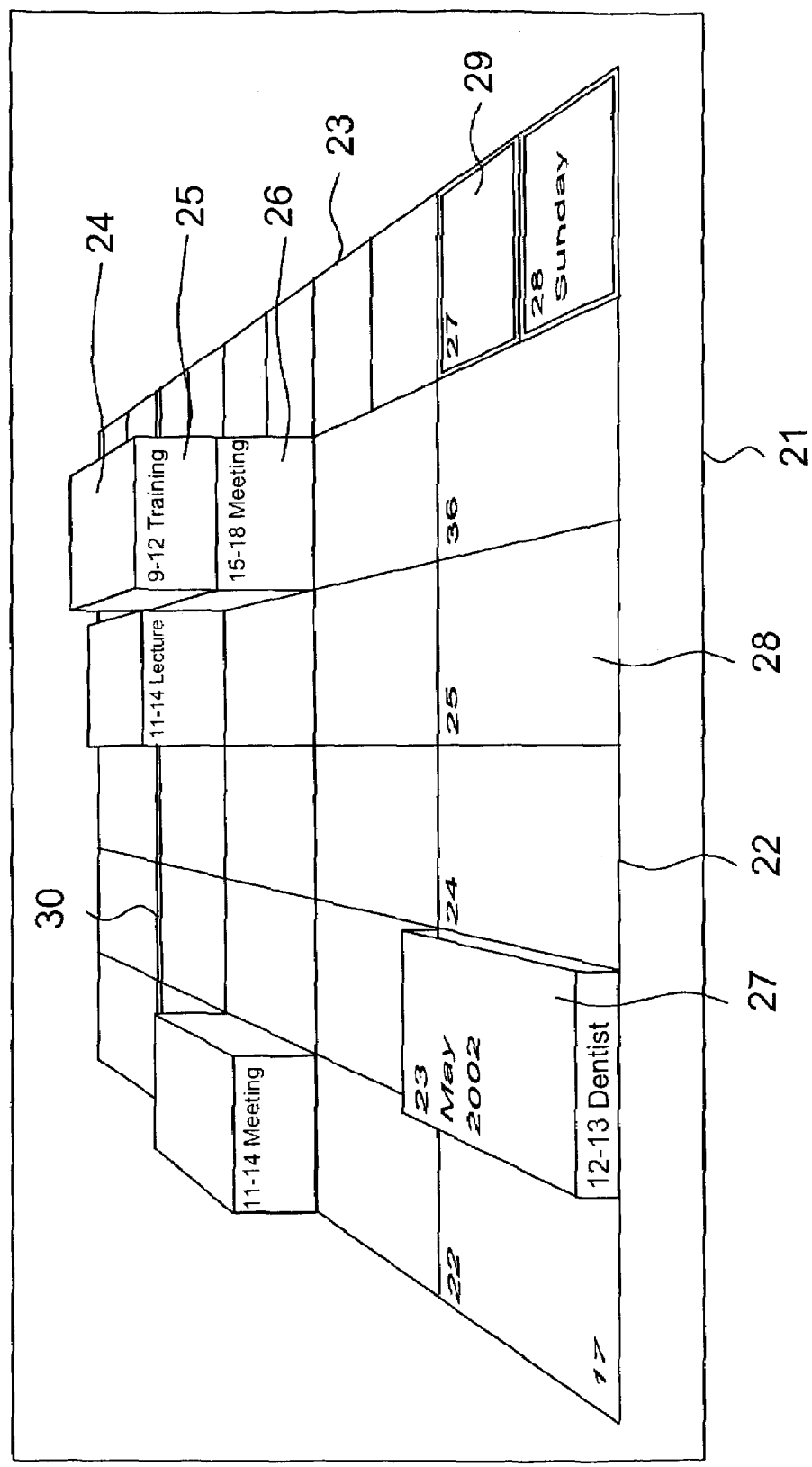
FIG. 3 shows a calendar view in a calendar system.

FIG. 1 shows, on the principle level, the assembly of a typical computer device 1, which is a personal computer (PC) device. The device 1 is normally placed in a housing 2, and it comprises a mother board 3 with a central processing unit (CPU), the necessary ROM memories (BiosROM), as well as an internal bus 4 to which it is possible to connect various components, such as a network adapter 9 which is further connected to a network 10. The necessary memory components for a working memory (RAM) are also connected to the mother board 3. Further, the device 1 comprises a keypad 8, through which the data are entered, and a display 7, on which the information and the calendar view of FIG. 3 are displayed. A fixed disk 5 is used for storage, also including an operating system to control the operation of the device 1, application software being run under its control, and the necessary device drivers to control the operation of the different components, for example a display driver 6 for the display 7. In the selection and operation of the components, it is possible to apply techniques and methods known as such, as well as to select the necessary peripheral devices. Typically, the device is also provided with a diskette drive or a CD drive for reading various means in which software products are stored for distribution and installation on the fixed disk 5. The calendar system can also be divided in the presented way. The fixed disk 5 is used for the storage of data in different forms, for example in a database. The software complying with the calendar system is run in the above-presented device 1 according to one embodiment of the invention.

Figure 2:
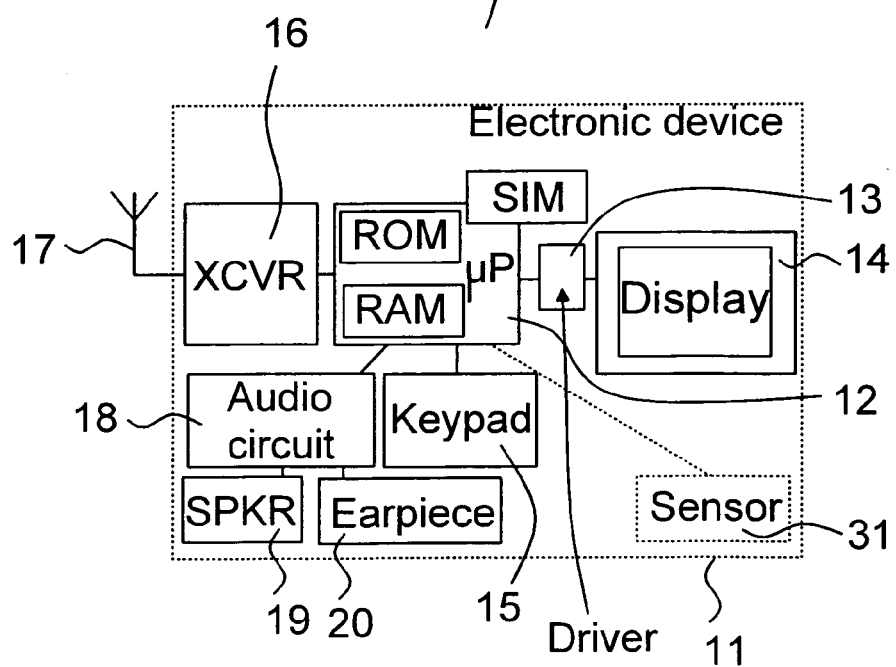
FIG. 2 shows the principle of an electronic device.

FIG. 2 shows a typical electronic device 11 which is particularly equipped with means facilitating wireleless data transmission. In this case, it is particularly a mobile phone according to, for example, the GSM or the GPRS system. The device 11 can also be arranged to operate in other mobile phone systems, in a wireless local area network or, for example, as a wireless phone. A processor and control unit 12 is the unit which controls the operation of the device and controls a display 14, typically by means of a display driver 13, and monitors the operation of a keypad 15 and the information entered via it. To control the information displayed on the display 14, a variety of ways can be applied, wherein the necessary information can be stored in a memory (RAM) which directly corresponds to a single point on the display 14, typically a pixel on a liquid crystal display (LCD), or the driver 13 can be given direct instructions for drawing. The device 11 also comprises RAM and ROM memories coupled to the processor for different purposes, for example for the storage of various applications. The processor 12 is also connected to the components of a transceiver 16. The transceiver 16 takes care of the wireless data transmission and comprises, for the purpose, for example an antenna 17. The device 11 is also provided with the necessary circuits for a speaker 19 and an earpiece 20 which are controlled by an audio circuit 18, as well as a SIM card (subscriber identity module). Components of the device 11 are normally integrated in circuit components or application specific integrated circuits (ASIC). The whole operation of the device is controlled by the control software of the unit 12 and by the necessary application software, in which the desired functions are programmed.

The calendar system is implemented in an integrated manner in the rest of the software of the device 11, or it can be loaded in it as separate software to be run under the control of the operating system or the control software. For this purpose, the device 11 may comprise, for example, a connection for a memory card and for its control, wherein said memory card comprises the calendar system and its database. By means of the basic software of the device and the services offered by it, the memory is available, for example, for reading and for storing information in a desired form, for example in a database, which definition will be used in this description to refer to various long-term storage locations for calendar data. The device 11 can be implemented with varying components and functions, and the database can be stored in memory media corresponding to the SIM card.

FIG. 3 shows the calendar view 21 of the calendar system as it will be displayed to the user on the display of the device of FIG. 1 or FIG. 2 according to an advantageous embodiment of the invention. The calendar data stored in the database normally cover a very long period of time, of which a suitable period, usually a month 23 or a week 22, is normally picked up for viewing. The period also comprises shorter periods of interest, particularly a single day 24 or a period of hours 25. The information on the period is read and used at least partly for the display of the view 21. The information normally comprises single activities of the user of the calendar which are related, for example, to work, hobbies, leisure time, studying, and particularly the person's time management. In the embodiment shown in FIG. 3, the emphasis is particularly in the time taken by the tasks, wherein the height dimension of single bars 24 in the bar chart depends on the time taken by the activities in hours. The view 21 can also be built up in such a way that the overall view will include all the hours of a single day in bars, each bar comprising a minute schedule. In a corresponding manner, it is possible to look at a single year, in which bars are displayed on the basis of months or weeks. The height dimension of the week bars depends, for example, on the total load rate of the week, computed as the sum of the single days in the week.

The calendar view 21 comprises a 3-dimensional bar diagram by which it is easy to quickly notice different aspects, such as the most loaded day, the distribution of the load and the activities on the different days, the busiest time of the month, and the relation of different days to each other. In the presented embodiment, the bars 24 are rectangular and tightly next to each other, but also other shapes are possible. Thus, also a bar with an oval or circular cross-section is feasible, wherein the bar 24 comprises a set of discs placed on top of each other. Another alternative form is a sphere, wherein the bar 24 comprises a set of spheres placed on top of each other, the desired data being displayed on their surface. The dimension selected to be variable is the height, which correlates with the information of the day. The bars can also be thought of as blocks which are piled on top of each other when tasks are increased, or bars which rise from the bottom level 28, but at the beginning, their upper surfaces 27 are on the same level. The bars can thus be provided with various effects, wherein information can also be placed between single blocks in the bar, to be made visible by moving or deleting blocks. In the same way, it is possible to place information on the back surface of the bar 24 which is not visible in FIG. 3 but which can be exposed as long as the view 21 is rotated to a sufficient degree. It can even be used for storing personal information, if the calendar system is jointly used by various persons, wherein the rotating is dependent on a password.

The calendar can also be provided with an effect in which the bars rise and descend or even disappear completely. In this way, the bars standing behind and the information placed on their front side 26 become visible. The information denotes tasks in the schedule. Bars can also be deleted week by week, for example for the week 22, and in FIG. 3 the last week of the month 23 is deleted and the view is brought closer to the viewer by zooming it. The user can control the view by means of a keypad and, for example, by means of control rollers in the keypad.

In the calendar view 21, the bars are equipped with symbols which describe the duration or time of shorter periods. Thus, in one embodiment, the upper surface 27 of the bar indicates the date, month and year, and also the number of the week, if necessary. The front surface 26 of the bar indicates the time interval or duration of the task, to determine the height of the bar. The height can also be found out by software on the basis of the starting times of the tasks or on another basis or by other information.

The view can also be provided with various framings 30 to indicate, for example, the preceding or next month, if it is also selected to be partly visible in the view 21. The days of the weekend can be marked with various effects 29 to be easily visible.

In the view 21 of FIG. 3, the user's angle of viewing is selected so that the user is thought to be in front of the period 23 and slightly above it, wherein the angle of viewing is in a rate of about 45° to the plane in which the upper surfaces 27 of the bars 24 are at a minimum. In one embodiment, the direction of viewing is not fixed but the angle of viewing can be selected and dynamically changed by the viewer, wherein it is possible to rotate the month period 23 around the vertical direction within at least some limits. By selecting the angle of viewing to be 0°, only the desired week 22 and the front sides of its bars are made visible. By selecting the angle of viewing to be 90°, only the flat upper surfaces of the bars are made visible, wherein only the information presented in them is visible, and it is thus possible to simulate calendar views of conventional style. In one embodiment of the invention, the electronic device comprises sensor means which are intended to detect the position of the device, or a change in the position. The signal obtained from the sensor means is utilized in the control in such a way that the direction and angle of viewing is changed as a result of a change in the position of the device. Thus, particularly the tilting of the device forward or backward (changing the angle of looking at the view 21) as well as sideways (changing the direction of looking at the view 21) is feasible. Said sensor means 31 are also indicated as options in FIG. 2.

A substantial part of the calendar system is explained above, and in other respects, it can be provided with methods and details known from other calendar systems, for example to control the input, editing and displaying of information in various reports. The calendar system can also be provided with views in conventional style. In its simplest form, the view 21 is controlled, for example, by means of a mouse or a controllable cursor, to select the desired day, and the default setting being the editing of an entry or the addition of a new entry. In mobile phones, the cursor is, for example, an effect to highlight the date in question, and the editing of the date is selected, for example, by pressing a control roll or a key. The front surface of bars in FIG. 3 shows one way of writing information directly on the bar.

The invention is not limited solely to the advantageous embodiment and example presented above, but it may vary within the scope of the presented claims.

The invention claimed is:

1. A method, comprising:
   reading calendar data of a period from a database for a period-specific calendar view in an electronic device with a display for displaying information and a database for storing calendar data, wherein the period comprises a set of shorter periods which cover the period for display in the calendar view, and wherein said calendar data comprise a set of user activities allocated to said shorter periods,
   displaying the calendar view on the display of the device by using said calendar data, wherein a quantitative distribution of said user activities is for visualization in a three-dimensional bar chart having a plurality of single bar structures, in which a single bar structure illustrates a shorter period and a length dimension of said structure is dependent on a quantity of activities within said shorter period, and
   equipping a non-visible surface of one or more of said single bar structures with information related to said user activities.

2. The method according to claim 1, further comprising providing the bar chart with symbols denoting duration or time of the shorter periods.

3. The method according to claim 2, further comprising equipping the bar chart with information explaining the user activities, or time or duration of the user activities within the shorter periods, or a combination of this information.

4. The method according to claim 2, further comprising arranging the bar chart in a plane, having a surface from which the single bar structures extend to varying heights.

5. The method according to claim 1, further comprising arranging the bar chart in a plane, said plane having a surface from which single bar structures extend to varying heights.

6. The method according to claim 5, further comprising arranging the single bar structures of the bar chart in a form of rows and columns, in which one or more shorter periods are placed behind other shorter periods, when the chart is viewed on the display.

7. The method according to claim 5, further comprising controlling the calendar view of the display in such a way that an angle or direction for viewing the bar chart by the user is changed under control of the user.

8. The method according to claim 5, further comprising changing a size of one or more bar structures by the user, or deleting at least one bar structure from the calendar view, wherein hidden or covered single bar structures are better exposed.

9. The method according to claim 1, further comprising arranging single bar structures of the bar chart in a form of rows and columns, in which some of the shorter periods are placed behind other shorter periods for viewing the chart on the display.

10. The method according to claim 1, wherein said period is a month, and said shorter period is a day.

11. The method according to claim 10, further comprising the step of further dividing the shorter period into periods of an hour.

12. The method according to claim 1, further comprising controlling the calendar view of the display in such a way that an angle or direction for viewing the bar chart by the user is changed under control of the user.

13. The method according to claim 12, further comprising controlling the angle or direction of viewing on the basis of a position of the electronic device, or a change in the position.

14. The method according to claim 12, further comprising
equipping a non-visible back surface of one or more of the single bar structures with personal information, and if a password is given by the user, changing the angle or direction of viewing the bar chart for exposing said non-visible back surface.

15. The method according to claim 1, further comprising changing a size of one or more bar structures by the user, or deleting at least one bar structure from the calendar view, wherein hidden or covered bar structures are better exposed.

16. The method according to claim 1, further comprising
equipping a non-visible surface of one or more single bar structures with personal information, and exposing said personal information if a password is given by the user.

17. The method according to claim 1, further comprising
constructing one or more single bar structures from blocks piled on top of each other, and placing information related to said user activities on said blocks.

18. Apparatus, comprising:
a processor for reading calendar data of a period from a database for display of a period-specific calendar view, wherein the period comprises a set of shorter periods which cover the period for display in the calendar view, and wherein said calendar data comprise a set of user activities which are allocated to said shorter periods; and a display for displaying the calendar view, wherein a quantitative distribution of user activities within the period is for visualization in a three-dimensional bar chart, wherein a single bar structure illustrates a shorter period of time and a length dimension of said structure is dependent on a quantity of activities within said shorter period and wherein a non-visible surface of the single bar structure is equipped with information related to said user activities.

19. The apparatus according to claim 18, further comprising a control device for controlling the calendar view of the display in such a way that an angle or direction for viewing the bar chart by the user is changed under control of the user.

20. The apparatus according to claim 19, further comprising a device for the user to change size of one or more bar structures or to delete at least one bar structure from the calendar view, wherein one or more hidden or covered bar structures are better exposed.

21. The apparatus according to claim 19, wherein a non-visible back surface of one or more of the single bar structure is equipped with personal information, and wherein, if a password is given by the user, said display is arranged to change the angle or direction of viewing the bar chart for exposing said non-visible back surface.

22. The apparatus according to claim 18, further comprising a control device for the user to change size of one or more bar structures or to delete at least one bar structure from the calendar view, wherein one or more hidden or covered bar structures are better exposed.

23. The apparatus according to claim 18, wherein said device is a portable mobile phone.

24. The apparatus according to claim 18, further comprising
a sensor for detecting a change in position of the apparatus, and a control for controlling the calendar view of the display in such a way that an angle or direction for viewing the bar chart by the user is controlled by changing the position of the apparatus.

25. The apparatus according to claim 24, wherein said apparatus is a portable mobile phone.

26. The apparatus according to claim 18, wherein a non-visible surface of one or more of the single bar structures is equipped with personal information, and wherein said display is arranged to expose said personal information if a password is given by the user.

27. The electronic device according to claim 18, wherein at least one of the single bar structures comprises blocks piled on top of each other and information related to said user activities is placed on said blocks.

28. A computer program product comprising program code stored on a computer readable medium for generating a period-specific calendar view, said program code comprising:

program code for reading calendar data of a period from a database for a calendar view, wherein the period comprises a set of shorter periods which cover the period in a compiled manner for display in the calendar view, and wherein said calendar data comprise a set of user activities allocated to said shorter periods, program code for displaying the calendar view on a display of a device by using said calendar data, wherein a quantitative distribution of said user activities within the period is for visualization in a three-dimensional bar chart, in which a single bar structure illustrates a shorter period and a length dimension of said structure is dependent on a quantity of activities within said shorter period, and program code for equipping a non-visible surface of said single bar structure with information related to said user activities.

29. The computer program product according to claim 28, further comprising program code for arranging the bar chart in a plane, said plane having a surface from which single bar structures extend to varying heights.

30. The computer program product according to claim 28, further comprising program code for controlling the calendar view of the display in such a way that an angle or direction for viewing the bar chart by the user is changed under control of the user.

31. The computer program product according to claim 30, further comprising program code for changing a size of one or more bar structures by the user, or deleting at least one bar structure from the calendar view, wherein one or more hidden or covered bar structures are better exposed.

32. The computer program product according to claim 30, further comprising
program code for equipping a non-visible back surface of one or more of the single bar structures with personal information; and program code, if a password is given by the user, for changing the angle or direction of viewing the bar chart for exposing said non-visible back surface.

33. The computer program product according to claim 28, further comprising program code for changing a size of one or more bar structures by the user, or deleting at least one bar structure from the calendar view, wherein one or more hidden or covered bar structures are better exposed.

34. The computer program product according to claim 28, further comprising
program code for equipping a non-visible surface of one or more of the single bar structures with personal information; and
program code for exposing said personal information if a password is given by the user.

35. The computer program product according to claim 28, further comprising
program code for constructing one or more of the single bar structures from blocks piled on top of each other; and
program code for placing information related to said user activities on said blocks.

36. Apparatus programmed to read calendar data of a period from a database for a calendar view, wherein the period comprises a set of shorter periods which cover the period for display in the calendar view, and wherein said calendar data comprise a set of user activities allocated to said shorter periods,
display the calendar view on a display of a device by using said calendar data, wherein a quantitative distribution of said user activities is for visualization in a three-dimensional bar chart having a plurality of single bar structures, in which a single bar structure illustrates a short period and its length dimension of said structure is dependent on a quantity of activities within said short period; and
equipping a non-visible surface of one or more of said single bar structures with information related to said user activities.

37. The apparatus according to claim 36, further comprising arranging the bar chart in a plane, said plane having a surface from which single bar structures extend to varying heights.

38. The apparatus according to claim 36, further comprising controlling the calendar view of the display in such a way that an angle or direction for viewing the bar chart by the user is changed under control of the user.

39. The apparatus according to claim 38, further comprising changing a size of one or more bar structures by the user, or deleting at least one bar structure from the calendar view, wherein hidden or covered bar structures are better exposed.

40. The device according to claim 38, further comprising
equipping a non-visible back surface of one or more of the single bar structures with personal information; and
if a password is given by the user, changing the angle or direction of viewing of the bar chart for exposing said non-visible back surface.

41. The apparatus according to claim 36, further comprising changing a size of one or more bar structures by the user, or deleting at least one bar structure from the calendar view, wherein hidden or covered bar structures are better exposed.

42. The apparatus according to claim 36, further comprising
equipping a non-visible surface of the single bar structures with personal information; and
exposing said personal information if a password is given by the user.

43. The device according to claim 36, further comprising
constructing one or more of the single bar structures from blocks piled on top of each other; and
placing information related to said user activities on said blocks.

* * * * *